(12) United States Patent
Jester

(10) Patent No.: US 6,439,644 B1
(45) Date of Patent: Aug. 27, 2002

(54) HAIL COVER FOR VEHICLES

(76) Inventor: Shaun P. Jester, 7723 Society Dr., Claymont, DE (US) 19703

( * ) Notice: Subject to any disclaimer, the term of this patent is extended or adjusted under 35 U.S.C. 154(b) by 0 days.

(21) Appl. No.: 09/805,334

(22) Filed: Mar. 13, 2001

Related U.S. Application Data

(63) Continuation-in-part of application No. 09/415,073, filed on Oct. 12, 1999.

(51) Int. Cl.$^7$ .................................................. B60J 7/20
(52) U.S. Cl. ........................ 296/136; 135/119; 150/166; 52/DIG. 4
(58) Field of Search ............................. 296/136; 52/3, 52/DIG. 14; 150/166; 135/119

(56) References Cited

U.S. PATENT DOCUMENTS

| | | | | |
|---|---|---|---|---|
| 4,432,581 A | * | 2/1984 | Guma | 296/136 |
| 4,858,985 A | * | 8/1989 | Wojcik | 296/136 |
| 5,241,977 A | * | 9/1993 | Flores et al. | 135/119 |
| 5,252,209 A | * | 9/1993 | Heck | 296/136 |
| 5,287,904 A | * | 2/1994 | Smith et al. | 150/166 |
| 5,401,074 A | * | 3/1995 | Timerman | 296/136 |
| 5,497,819 A | * | 3/1996 | Chiang | 296/136 |
| 5,516,181 A | * | 5/1996 | Thompson | 296/136 |
| 5,566,512 A | * | 10/1996 | Page | 52/DIG. 14 |
| 5,664,825 A | * | 9/1997 | Henke et al. | 296/136 |
| 5,673,961 A | * | 10/1997 | Mazzarelli | 296/136 |
| 5,738,403 A | * | 4/1998 | Tyson | 296/136 |
| 5,800,006 A | * | 9/1998 | Pettigrew | 296/136 |
| 5,890,525 A | * | 4/1999 | Shores | 150/166 |
| 6,044,881 A | * | 4/2000 | Welch et al. | 150/166 |
| 6,056,347 A | * | 5/2000 | D'Adamo | 296/136 |
| 6,070,629 A | * | 6/2000 | Whiteside | 150/166 |
| 6,220,648 B1 | * | 4/2001 | Daniel | 296/136 |

FOREIGN PATENT DOCUMENTS

DE  3928695 A1 * 3/1991 ............ B60J/11/00

* cited by examiner

*Primary Examiner*—Kiran B. Patel
(74) *Attorney, Agent, or Firm*—George L. Williamson

(57) ABSTRACT

The present invention discloses a device for a cover on a vehicle, group of vehicles or building whereby the vehicles are protected from falling hail during a hail storm. The present invention comprises a flexible cover having an air blower for constantly supplying air to the cover along with spring-loaded outlet air valves whereby a preset pressure is maintained in the cover. The cover operates somewhat on the principle of a hovercraft according to dynamic physics. An air blower is also provided along with straps for holding the cover onto the vehicle.

12 Claims, 3 Drawing Sheets

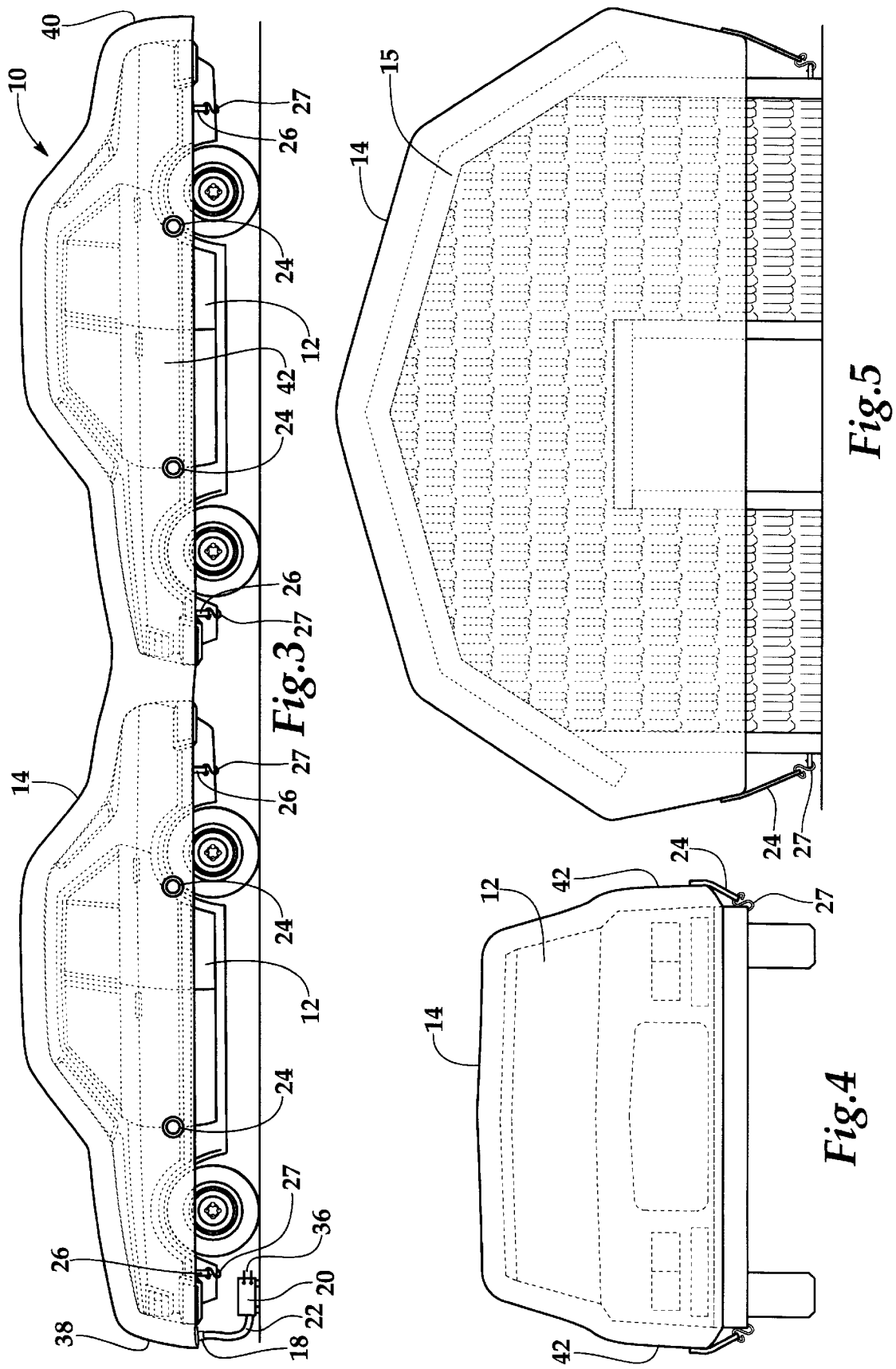

HAIL COVER FOR VEHICLES

This application is a continuation-in-part of application Ser. No. 09/415,073 filed on Oct. 12, 1999.

BACKGROUND OF THE INVENTION

1. Field of the Invention

The present invention relates generally to covers for vehicles, buildings or the like, and, more particularly, is concerned with a cover for a vehicle or building capable of protecting the vehicle from damage during a hail storm whereby the cover operates with a constant supply of air according to dynamic physics.

2. Description of the Prior Art

Covers for automobiles have been described in the prior art. However, none of the prior art devices disclose the unique features of the present invention being, e.g., use of a constant supply of air since all of the prior art operates according to static physics.

In U.S. Pat. No. 6,044,881, dated Apr. 4, 2000, Welch, et al., disclosed a cover which protects a vehicle from damage by weather. Welch operates according to static physics since the pump is disconnected and stowed after inflation (see Column 4, lines 57–60). The cover has a flexible shell that is located over the surface of the vehicle. The shell is spaced from the surface by at least one inflatable tube. The inflatable tube is coupled to the underside of the shell by way of an attachment tube. The attachment tube is coupled to the underside of the shell by way of one or more flaps. The attachment tube has an interior cavity that receives the inflatable tube therein. The attachment tube has plural lengths, with each length extending adjacent to at least one other length. The lengths are separated from each other by gaps so as to space apart the attachment tubes and minimize the weight of the cover. A single attachment tube and a single inflatable tube can be used, wherein the tubes are laid out on the shell in a spiral or a zigzag pattern.

In U.S. Pat. No. 5,800,006, dated Sep. 1, 1998, Pettigrew disclosed a protective vehicle cover for the prevention and reduction of damage from hail and similar free falling bodies. A reversible waterproof vinyl on two sides of an impact resistant plastic material covers the top, sides, front, and rear surfaces of a vehicle. The impact resistant material transmits the force of the impact to its opposing side to reduce the amount of force per unit of arcs so as to prevent damage as the force is transmitted to the vehicle. Utilization of the impact resistant material permits a product which is lightweight, compact, portable, and stores easily in a vehicle trunk compartment.

In U.S. Pat. No. 4,858,985, dated Aug. 22, 1989, Wojcik disclosed a vehicle cover which protects most exposed parts of a motor vehicle from harsh climatic conditions including sun, rain, chemical fallout, pollution, dust, snow, sleet and hail. The cover is attached either within the vehicle or attached externally, mounted within a housing. A retractable cover covers the surface of the car. The cover may also be mounted over supporting members in order to provide protection from damage due to hail. The cover may be mounted upon two adjustable poles, which further provides for a sunshade available to persons or objects adjacent to the vehicle.

In U.S. Pat. No. 5,242,206, dated Sep. 7, 1993, Heck disclosed an inflatable vehicle cover which provided for protecting the body of a vehicle from damage from the force of impacting foreign objects. The cover includes a generally rectangular top cover of dimension to substantially cover the upper surface of a vehicle, to which is connected a generally rectangular bottom cover. The connection between the top and bottom covers is around the periphery of the bottom cover, thus forming a fluid-tight chamber. The bottom cover is further connected to the top cover interior of the periphery of the bottom cover such that two or more separate fluid-tight chambers may be formed. For introducing fluid into the various chambers, one or more stem valves is provided. Also provided is an apparatus for permitting release of fluid from the chambers, thereby allowing deflation. Finally, apparatus for securing the cover to the body of the vehicle is provided whereby the inflatable vehicle cover may cover and protect the upper surface of a vehicle.

In U.S. Pat. No. 5,287,904, dated Feb. 22, 1991, Smith, et al., disclosed an inflatable rubber air chamber which is bonded to a rubber blanket. The inflatable rubber air chamber is inflated through an inflation tube. When inflated, a six-inch cushion of air is created inside the air chamber. A cotton liner is bonded to the underside of the rubber blanket. All components could be bonded and sealed by rubber cement. The device could be custom made to fit the particular year, make and model of the vehicle.

In U.S. Pat. No. 5,401,074, dated Mar. 28, 1995, Timerman disclosed a vehicle cover that protects a vehicle from hail and other falling objects and is easily installed, removed, and stored in the trunk of the vehicle. The cover is substantially comprised of a sheet of cloth, several foam runners, and several attaching straps. The foam runners, preferably having a rectangular cross section, attach to the underside of the cloth. When placed on a vehicle, the foam runners support the cloth in a spaced apart relationship with the top of the vehicle. The attaching straps securely attach the cover to the vehicle by attaching to the wheel wells and the front and rear bumpers of the vehicle. The attaching straps hold the cloth in a taut condition so that the cloth remains in a spaced apart relationship with the top of the vehicle. Falling objects, such as hail, are repelled by the taut cloth and damage to the vehicle is prevented. The foam runners and straps are adjustable so that the cover fits a variety of vehicles.

In U.S. Pat. No. 5,664,825, dated Sep. 9, 1997, Henke, et al. disclosed a cover for protecting vehicles or structures from the damaging impact of hailstones or other falling objects. The cover includes a plurality of energy-absorbing rods disposed parallel and closely adjacent to one another along their long dimensions. The rods are substantially circular in cross section and made of a resilient material. The rods are held in their relative positions by an enclosing means, which may be two flexible sheaths made of a textile. The first and second sheaths are fastened together between and along the long dimensions of the rods, and at the perimeters of the sheaths, so as to enclose and hold the rods, forming the assembled cover. This construction allows the cover to be rolled up for easy storage. The cover has fastening means, such as flanges for tie downs, for attaching the cover to a vehicle to be protected.

While these devices for covering vehicles may be suitable for the purposes for which they were designed, they would not be as suitable for the purposes of the present invention, as hereinafter described.

SUMMARY OF THE INVENTION

The present invention discloses a portable device for providing a cover on a vehicle, group of vehicles or building whereby the vehicles are protected from falling hail during a hailstorm. The present invention comprises a flexible vehicle cover having an air blower for constantly supplying air to the inner chamber of the cover along with air pressure-relief outlet valves whereby a preset pressure is maintained in the cover. The present invention operates similar to the principle of a hovercraft according to dynamic physics, and, therefore, an air blower is also provided along with straps for holding the cover onto the vehicle.

An object of the present invention is to protect the vehicle from hail damage during a hailstorm. A further object of the present invention is to provide an inexpensive way to protect the vehicle from hail damage during a hailstorm. Another object of the present invention is to provide a cover for protecting the vehicle from hail damage which cover can be conveniently stored inside the trunk of the vehicle.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 3 is a side view of the present invention in operative connection with a plurality of vehicles.

FIG. 4 is an end view of the present invention in operative connection.

FIG. 5 is an alternative embodiment of the present invention installed on a building.

LIST OF REFERENCE NUMERALS

Figure 1:
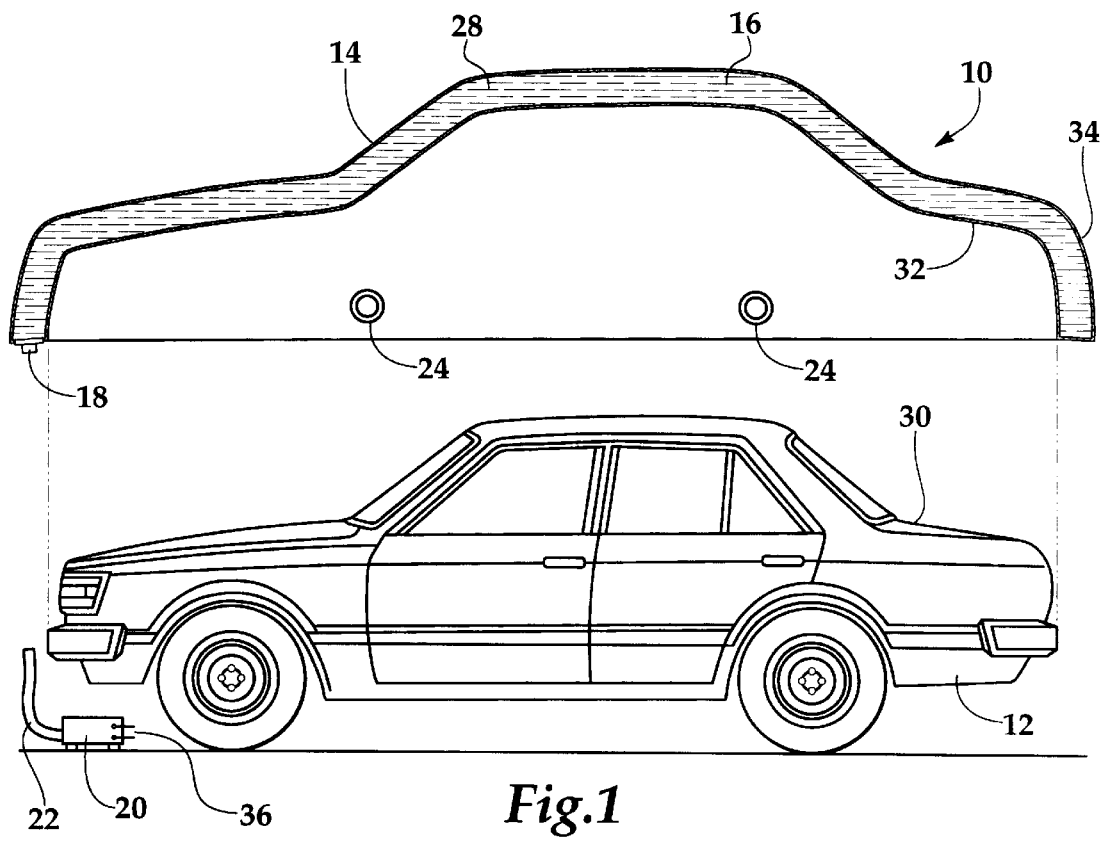
FIG. 1 is a cross-sectional view taken in the approximate middle of the present invention shown with a vehicle.

With regard to reference numerals used, the following numbering is used the drawings.

10 present invention
12 vehicle
14 flexible cover
15 building
16 air
18 air inlet
20 blower
22 air hose
24 pressure relief valves
26 tie down straps
27 hooks
28 interior cavity
30 upper surface of vehicle
32 inner surface
34 outer surface
36 means for electrical connection
38 cover front
40 cover rear
42 cover side

DESCRIPTION OF THE PREFERRED EMBODIMENT(S)

Turning now descriptively to the drawings, in which similar reference characters denote similar elements throughout the several views, FIGS. 1 through 5 illustrate the present invention being a portable cover to protect a vehicle or building from hail damage.

Turning to FIG. 1, therein is shown a cross-sectional view of the present invention generally shown at 10 along with a vehicle 12. Shown therein is a flexible cover 14 made of very strong impervious, flexible material being rubber or plastic-like material forming an inflated cover having air 16 in its interior cavity or air chamber 28. The cover 14 is pre-formed into the approximate shape of the vehicle as shown or other object to be covered and adapted to be positioned over and completely cover the surface 30 of vehicle 12 effective to protect the vehicle 12 from falling hail during a hail storm. The cover 14 has an inner surface 32 and outer surface 34. Also shown is an air inlet connection 18 wherein air is input constantly from a blower means 20 through a blower hose 22 for inflating and maintaining the present invention 10 in an inflated condition. Also shown are means 24 for maintaining a preset internal air pressure, e.g., spring-loaded valves 24 or the like, positioned on the lower part of the cover 14 whereby a pre-selected air pressure can be maintained inside the present invention 10. Pressure relief valves 24 are disposed in outer surface 34 and are of the standard type as would be selected by one skilled in the art in the standard manner and communicate with the inside and outside ambient air of cover 14. Electrical connection 36 is also shown however, the blower 20 could also be powered by a gas or diesel engine or the like.

Figure 2:
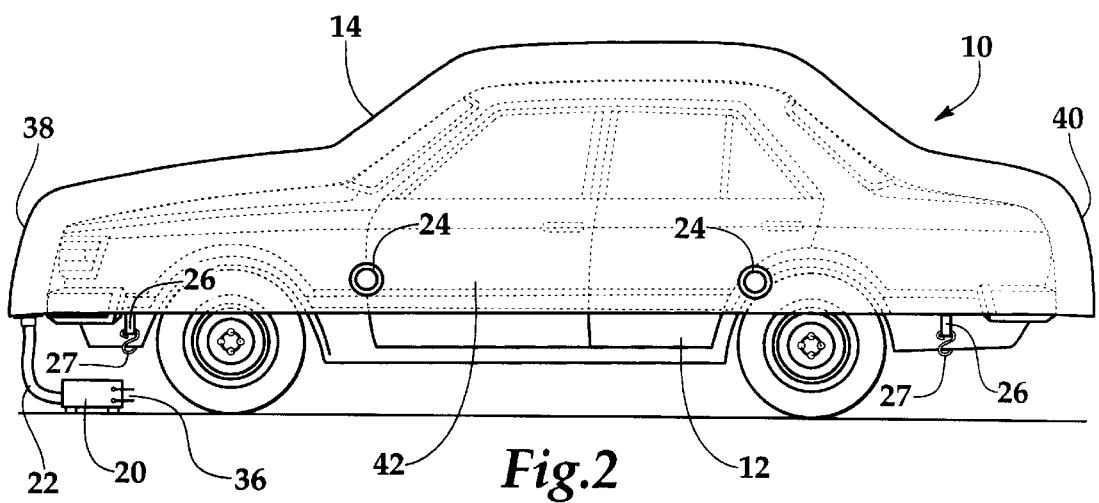
FIG. 2 is a side view of the present invention in operative connection.

Turning to FIGS. 2 and 3, therein is shown the present invention 10 in operative connection on one or more vehicles 12. Shown therein is a flexible cover 14 of very strong rubber or plastic-like material forming an inflated cover having air in its interior with a downwardly extending front 38, rear 40, and pair of sides 42. The vehicle 12 is shown in hidden line view under the cover. Also shown is an air inlet connection 18 wherein air is input from a blower 20 to a blower hose 22 for inflating and maintaining the present invention in an inflated condition. Also shown are spring-loaded valves 24 positioned on the lower part of the cover 14 whereby a pre-selected air pressure can be maintained inside the present invention 10. Also shown are tie-down straps 26 with hooks 27 thereon for securing cover 14 onto the vehicle 12. Means for electrical connection 36 of the blower 20 to an AC or DC power source are also provided as would be done in the standard manner by one skilled in the art.

After use, cover 14 can be deflated by removing hose 22 from inlet 18 and allowing all air to be removed. Thereafter, the cover can be folded and placed in the trunk of the car or other convenient location. Also, note the present invention may be used on a single vehicle at a time or on multiple vehicles as a unit and could be built to be a very large cover for protecting multiple vehicles, e.g., 50 vehicles, and to cover an entire vehicle parking lot with a single unit. Also, the present invention can be used to cover a building.

As used herein, the term "vehicle" shall denote means for transporting things including automobiles, boats, planes, recreational vehicles, trucks, motorcycle, van, building or part of a building, or the like.

Turning to FIG. 4, therein is shown the cover 14 disposed onto a vehicle 12 showing the tie-down straps 24 with attachment means, e.g., hooks 27, disposed thereon for connection of strap 24 to underside or other suitable point of vehicle 12. Sides 42 are also shown.

Turning to FIG. 5, therein is shown the cover 14 disposed onto a building 15 showing the tie-down straps 24 with attachment means, e.g., hooks 27, disposed thereon for connection of strap 24 to building 15.

A rigorous mathematics analysis has been used to determine the expected thickness of cover 14 to be about six inches, having a range of from about 5.5 inches to 6.5 inches. A portable, light weight air blowing apparatus 20 that blows approximately six cubic feet of air per second and which can run for approximately 30 minutes, blows air into cover 14 that is of the approximate dimensions of a car. Blower means 20 must be at least effectively large enough to maintain said cover inflated to about six inches thickness. The airtight, water tight cover inflates to a thickness of about six inches with an internal pressure of about 22 p.s.i. in about 64 seconds. At 22 p.s.i., baseball size hail, weighing about 0.45 lb. and traveling at a terminal velocity of about 89 miles per hour, decelerates to 0 miles per hour over approximately a five inch distance. There are spring loaded valves 24 gauged to open at a p.s.i. greater than the internal pressure of about 22 p.s.i. needed to stop the hail, but, not greater than 1.5 p.s.i. greater than the internal pressure in order to prevent rupturing cover 14. The valves 24 are necessary to prevent the cover 14 from rupturing due to the constant input air flow and the force of the hail. Additional mathematical calculations are also shown to further define the present invention.

Terminal Velocity

Baseball size hailstone diameter: D 2.882·in volume: $V - \frac{4}{3} \cdot \pi \cdot \left(\frac{D}{2}\right)^3$    $V = 205.4 \cdot cm^3$ area: $A - \pi \cdot \left(\frac{D}{2}\right)^2$    $A = 42.09 \cdot cm^2$ density of ice: $\gamma - 1000 \cdot \frac{kg}{m^3}$ Note: The density of ice is slightly less than the density of water, therefore, this figure will provide an increased force of impact. density:

drag coefficient: C:=0.5 for spherical objects mass of hailstone: $m_h - \gamma \cdot V$    $m_h = 0.205 \cdot kg$
$m_h = 0.45 \cdot lb$ density of air: $\rho = 1.20 \cdot \frac{kg}{m^3}$ terminal velocity: $v_t := \sqrt{\frac{2 \cdot m_h \cdot g}{C \cdot \rho \cdot A}}$    $v_t = 39.94 \cdot \frac{m}{sec}$ $v_t = 89.3 \cdot \frac{mi}{hr}$ Pressure of Blanket impact momentum: $p - m_h \cdot v_t$    $p = 8.2 \cdot \frac{kg \cdot m}{sec}$ impact distance: $x = 5 \cdot in$ deceleration: $a \frac{v_t^2}{2 \cdot x}$    $a = 6280.6 \cdot \frac{m}{sec^2}$ time of impact: $t = \frac{v_t}{a}$    $t = 0.0064 \cdot sec$ force of impact: $F \frac{p}{t}$    $F = 1290 \cdot newton$ $F = 290 \cdot lbf$ surface area of hemisphere: $S := 2 \cdot \pi \cdot \left(\frac{D}{2}\right)^2$    $S = 8.417 \cdot 10^{-3} \cdot m^2$ pressure to offset this force: $P := \frac{F}{S}$    $P = 22.2 \cdot psi$ Air Requirement ambient pressure: $P_a := 14.7 \cdot psi$ required pressure: $P_r := 23 \cdot psi$ volume of cushion:

length: $L = 18 \cdot ft$ width: $W := 6 \cdot ft$ height: $H := 4 \cdot ft$ cushion thickness: $th := 6 \cdot in$ volume:

$V_{top} = L \cdot W \cdot th$    $V_{top} = 54.0 \cdot ft^3$ $V_{end} := W \cdot H \cdot th$    $V_{end} = 12.0 \cdot ft^3$ $V_{side} := L \cdot H \cdot th$    $V_{side} = 36.0 \cdot ft^3$ $V_{total} := V_{top} - 2 \cdot (V_{end} + V_{side})$    $V_{total} = 150.0 \cdot ft^3$ -continued pump flow rate: $Q_p := 6.0 \cdot \frac{ft^3}{sec}$ Boyle's Law: $\frac{Q_1}{Q_2} = \frac{P_2}{P_1}$ $Q = \frac{V}{t}$ inflation time: $t = \frac{V_{total}(P_r|P_a)}{Q_p \cdot P_a}$     $t = 64.1 \cdot sec$

|  | Required Air Pressure (psi) Impact Distance | | |
| --- | --- | --- | --- |
| Hailstone Diameter (in) | 6 in | 5 in | 3 in |
| severe hail | 0.75 | 1.3 | 1.5 | 2.5 |
| golf ball | 1.654 | 6.1 | 7.3 | 12.2 |
| baseball | 2.882 | 18.5 | 22.2 | 37 |
| softball | 5 | 55.8 | 66.9 | 111.5 |
| largest recorded | 5.586 | 69.6 | 83.5 | 139.2 |

These are the curvefit equations. For each impact distance, the use of this equation will provide required pressure for a given stone diameter.

| Hailstone Diameter (in) | Equation |
| --- | --- |
| 6 | $y = 2.2311x^2 - 0.0008x$ |
| 5 | $y = 2.6792x^2 - 0.017x$ |
| 3 | $y = 4.4648x^2 - 0.0227x$ |

Figure 6:
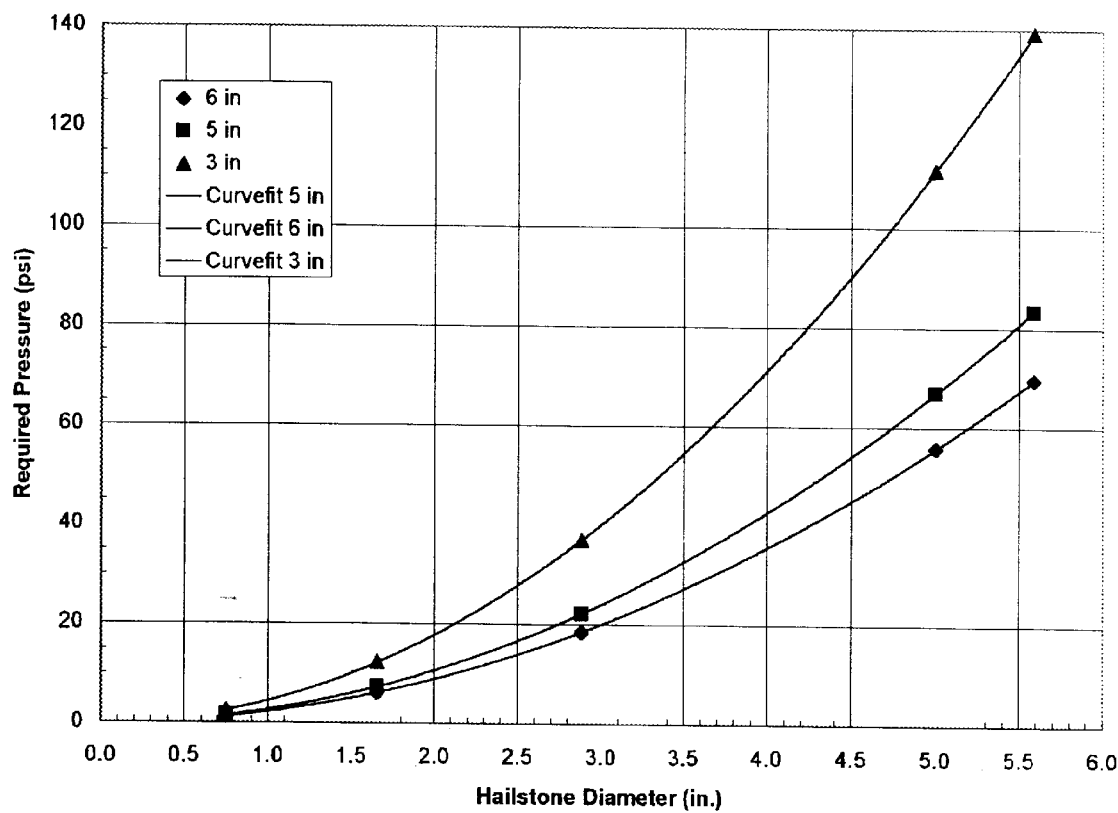
FIG. 6 is a graph to accompany the mathematical calculations.

FIG. 6 is a graphical representation of these calculations.

What is claimed to be new and desired to be protected by Letters Patent is set forth in the appended claims.

I claim:

1. In combination, apparatus for protecting a vehicle from falling hail during a hail storm, comprising:
   a) a cover for the vehicle, said cover adapted for being positioned on the vehicle;
   b) said cover defined by an inner surface and an outer surface,
   c) said cover further defined by a top, a downwardly extending front, a downwardly extending rear, and a pair of downwardly extending sides;
   d) said cover having the general shape of the vehicle;
   e) an air chamber formed by said inner surface and said outer surface;
   f) a means for constantly supplying air into said air chamber during a hail storm for maintaining said air chamber under pressure and said cover at a thickness in the range of about 5.5 to 6.5 inches;
   g) means for releasing air at a pressure greater than 22 p.s.i. from said air chamber; and,
   h) means for securing said cover onto the vehicle.

2. The apparatus of claim 1, wherein said cover is flexible.

3. The apparatus of claim 1, wherein said cover is made of rubber-like material.

4. The apparatus of claim 1, wherein said cover is made of plastic-like material.

5. The apparatus of claim 1, wherein said cover extends downwardly to cover substantially the entire vehicle.

6. The apparatus of claim 1, wherein said air chamber is maintained at said pressure and said cover is maintained at said thickness during a hail storm.

7. The apparatus of claim 1, wherein said means for blowing air has a capacity of at least six cubic feet per second.

8. The apparatus of claim 1, said means for securing further comprising straps having hooks thereon for securing said cover onto the vehicle.

9. The apparatus of claim 1, wherein said means for releasing air has a pressure relief setting of no more than 1.5 pounds per square inch greater than the pressure maintained inside said air chamber.

10. In combination, apparatus for protecting multiple vehicles from falling hail during a hail storm, comprising:
    a) a single cover for said multiple vehicles, said cover adapted for being positioned on the vehicles;
    b) said cover defined by an inner surface and an outer surface;
    c) said cover further defined by a top, a downwardly extending front, a downwardly extending rear, and a pair of downwardly extending sides;
    d) an air chamber formed by said inner surface and said outer surface;
    e) a means for constantly supplying during a hail storm air into said air chamber for maintaining said air chamber under pressure and said cover at a thickness in the range of about 5.5 to 6.5 inches;
    f) means for releasing air at a pressure greater than 22 p.s.i. from said air chamber; and,
    g) means for securing said cover over the vehicles.

11. The apparatus of claim 10, said means for securing further comprising straps having hooks thereon for securing said cover over the vehicles.

12. The apparatus of claim 10, wherein said means for releasing air has a pressure relief setting of no more than 1.5 pounds per square inch greater than the pressure maintained inside said air chamber.

* * * * *